United States Patent [19]
Ackermann

[11] Patent Number: 5,520,093
[45] Date of Patent: May 28, 1996

[54] METHOD FOR PREPARING A COFFEE BEVERAGE AND A COFFEE MACHINE FOR PERFORMING THE METHOD

[75] Inventor: Anton Ackermann, Wolfwil, Switzerland

[73] Assignee: Cosmec S.r.l., Urgnano, Italy

[21] Appl. No.: 334,137

[22] Filed: Nov. 4, 1994

[30]    Foreign Application Priority Data

Nov. 14, 1993 [DE] Germany .......................... 43 38 629.6

[51] Int. Cl.⁶ ..................................................... A47J 31/24
[52] U.S. Cl. ........................................ 99/289 T; 99/302 R
[58] Field of Search ............................. 99/289 T, 289 R, 99/289 D, 289 P, 279, 300, 302 R, 302 P, 295; 426/433

[56]               References Cited

U.S. PATENT DOCUMENTS

| | | | |
|---|---|---|---|
| 3,181,734 | 5/1965 | Ensign | 99/289 T |
| 3,213,777 | 10/1965 | Heier | 99/289 T |
| 3,356,011 | 12/1967 | Parraga | 99/289 T |

FOREIGN PATENT DOCUMENTS 702640   1/1965   Canada ................ 99/289 T 939813   10/1963   United Kingdom ................ 99/289 T

*Primary Examiner*—Robert W. Jenkins
*Attorney, Agent, or Firm*—Tarolli, Sundheim, Covell, Tummino & Szabo

[57]               ABSTRACT

In a method for preparing coffee drinks with the help of a plurality of coffee powder portions arranged along a transporting tape, a single coffee powder portion is removed from a storage container by pulling out the transporting tape to such an extent that the following coffee powder portions remain in the container. Then, the tape is cut behind the first coffee powder portion, and the new initial portion of the transporting tape is fixed in the region of the outlet opening of the container. In this way, the unused coffee powder portions remain fresh and keep their full flavor, even during an extended storage period.

The coffee machine suitable for performing this method comprises a two part brewing chamber. One portion of the brewing chamber is not only movable to and fro the other portion, but also rotatable and furthermore equipped with a catch member for grasping the initial portion of the transporting tape.

25 Claims, 3 Drawing Sheets

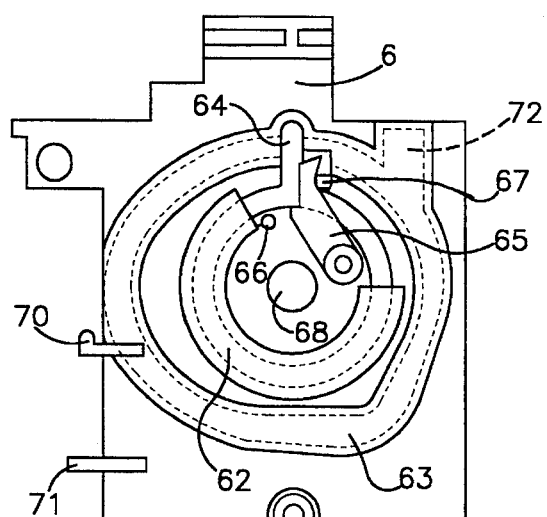
Fig.9
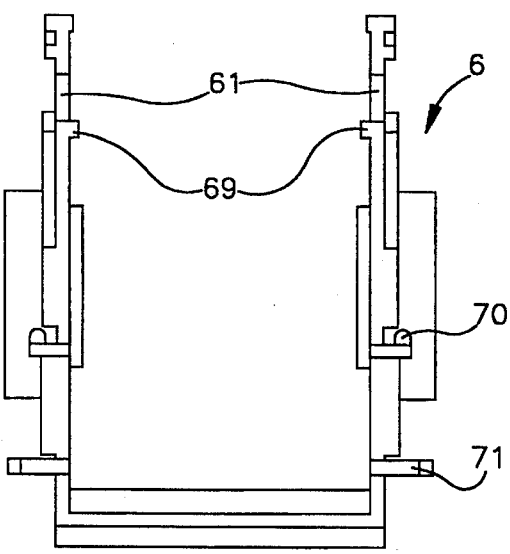
Fig.10
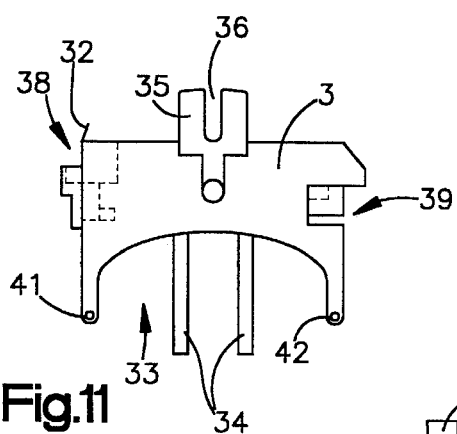
Fig.11
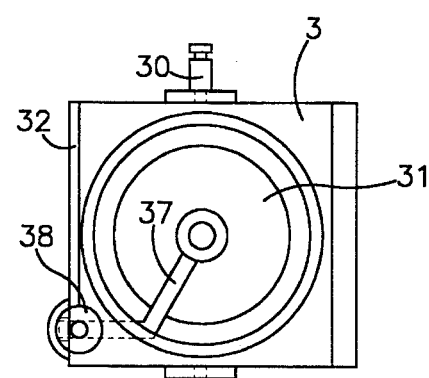
Fig.12
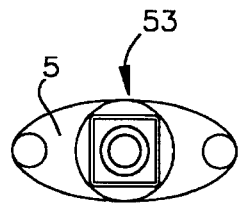
Fig.13
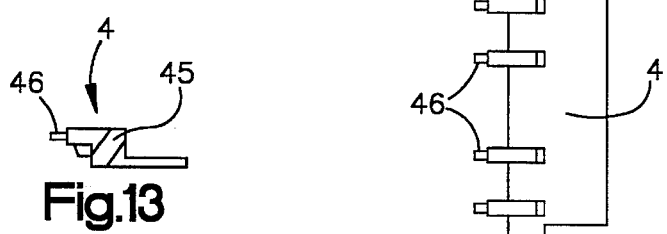
Fig.14
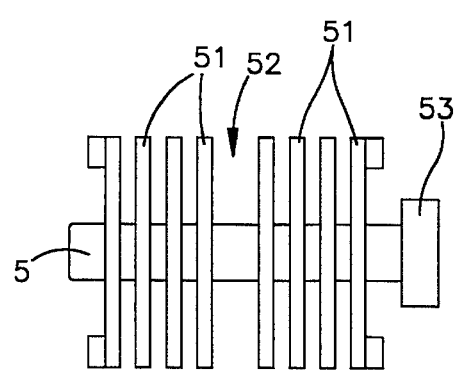
Fig.15
Fig.16

METHOD FOR PREPARING A COFFEE BEVERAGE AND A COFFEE MACHINE FOR PERFORMING THE METHOD

BACKGROUND OF THE INVENTION

The present invention relates, in a first aspect, to a method for preparing a coffee beverage by brewing a portion of coffee powder in a brewing chamber, whereby a plurality of portions of coffee powder are arranged along a transporting tape in a mutual distance and whereby the coffee powder portions arranged along said transporting tape are received in a container having an outlet opening. Moreover, the invention relates to a coffee machine for performing the above method, particularly to a coffee machine comprising a frame, a brewing chamber arranged in the frame and having a first brewing chamber portion and a second brewing chamber portion, means for supplying hot water to the brewing chamber, and means for opening said brewing chamber by separating the first and second portions thereof from each other to enable a portion of coffee powder to be loaded into the brewing chamber and to be removed from the brewing chamber, respectively, and for closing the brewing chamber by joining together the first and second portions thereof to enable a coffee beverage to be brewed by feeding hot water into the brewing chamber containing the portion of coffee powder.

PRIOR ART

Well known in the art are fully automatic so-called espresso machines which prepare a coffee drink by brewing a portion of ground coffee received in a brewing chamber. Such coffee machines, as a rule, comprise an integrated coffee mill for milling coffee beans supplied thereto. These coffee machines usually work well, but are quite expensive due to the incorporation of the milling assembly and the related lavish mechanical structure.

A further disadvantage of such coffee machines is the low cadence in which coffee drinks can be prepared. This cadence, not last, is due to the time consuming milling operation. Thus, these coffee machines are not unconditionally suitable for applications in which a great number of coffee drinks has to be prepared in a short time.

Moreover, the milling assembly itself has a decisive influence on the quality and the appearance of the finished coffee drink as the size of the granules thus produced and the regularity thereof is determined by the milling assembly. On the other hand, the size of the granules and the regularity of the powder are decisive criteria for the velocity of the brewing water in which the compressed coffee powder received in the brewing chamber is passed. As in such coffee machines preferably constant flow water heaters are used fur heating up the brewing water, the temperature of the brewing water and the appearance of the coffee drink is influenced by the aforementioned velocity. In other words, a milling assembly of inferior quality or a worn-out milling assembly has a direct negative influence on the quality of the finished coffee drink.

Furthermore, in such coffee machines, sensor means must be provided incorporating an assigned electronic control means for the exact dosing of coffee powder to the brewing chamber; this results in an elevated price of the final product again.

A still further disadvantage of known coffee machines of the kind referred to herein above is the fact that the coffee powder is in direct contact with certain parts and elements of the coffee machine whereby these parts and elements are subjected to a heavy contamination.

For the above mentioned reasons, it would be desirable that a coffee machine could use prepared portions of coffee powder received in a water permeable wrapping. Thereby, all the aforementioned disadvantageous could be avoided to a great extent.

The European Patent Publication EP 0 041 657 discloses a coffee machine which makes use of such prepackaged portions of coffee powder for brewing a coffee beverage. The coffee portions are arranged along a tape and are moved and fed to the brewing chamber in which the coffee drink is brewed by means of two transport rollers located one in front of the brewing chamber and one behind it. The fresh portions of coffee powder are stored in a first container provided for this purpose, and the used coffee portions are fed to a second container. The only drawing of this publication neither discloses whether or not a positive coupling between the transport rollers and the transportation tape is realized, nor in which way the beginning of the tape is inserted into the coffee machine and its transporting member, respectively. On the other hand, it is clearly evident that the two coffee portions which follow the one which is received in the brewing chamber are no longer received in the interior of the first container during the brewing cycle. This means that at least these two coffee powder portions loose their flavor, particularly in the case of long coffee preparation intervals.

As it is even not disclosed how the beginning of the transportation tape is grasped by the transporting member, it must be assumed that the insertion of the initial portion of the transporting tape into the machine is done manually. Moreover, at least one coffee powder portion must be brought into the region of the transport roller located behind the brewing chamber, with the result that this coffee powder portion, and probably also the next one, is lost and cannot be used for the preparation of a coffee drink. This leads to an unnecessary price increase of such a coffee powder package, related to the number of coffee drinks that can be prepared.

Moreover, a relatively wide distance must be provided between the individual coffee powder portions to ensure that only one coffee powder portion is positioned in the region of the brewing chamber and that the entire inserting and brewing operation functions in a satisfactory way. This again means that the transporting tape itself takes a lot of space in the interior of the container with the result that the price of the packed coffee powder portions is increased. Finally, it must be mentioned that the above cited publication does not disclose how a particular coffee portion is positioned in the brewing chamber.

A further disadvantage of this machine is that always the whole transporting tape and all coffee powder portions contained thereon, respectively, must be consumed before another tape with, if appropriate, coffee powder portions of a different kind can be used.

U.S. Pat. No. 3,327,613 discloses a beverage brewing apparatus which can be used as a coffee machine and which is adapted to make use of coffee powder portions arranged along a tape for brewing coffee drinks in a brewing chamber. The feeding of the tape is accomplished by means of two transporting members coupled to each other by means of a gear assembly. The transporting members are realized in the form of triangle-shaped prismatic bodies, each face thereof being provided with a cavity for receiving a portion of coffee powder. One of the transporting prisms is located in front of the brewing chamber and the other one behind it. Both transporting prisms are provided with indexing pins engaging apertures provided in the tape. Moreover, two containers are provided, one of which receiving the tape with the fresh portions of coffee powder and the other one receiving the tape portion with the used coffee portions.

The disadvantage of this apparatus is that always a plurality of coffee powder portions is subjected to atmospheric humidity and that always all coffee powder portions contained on the tape must be used before another tape containing, if appropriate, different coffee powder portions can be used. Furthermore, the transport mechanism incorporating the two transporting members interconnected by a complicated gear assembly is lavish and correspondingly expensive to manufacture.

The mentioned U.S. Patent does not disclose how the grasping of the initial portion of the transporting tape is accomplished. In all probability, the first coffee powder portion must be inserted manually into the cavity of the transporting member located behind the brewing chamber in order to ensure that a transport of the following coffee powder portions into the brewing chamber is even possible. This means, however, that the coffee powder portion located frontmost on the tape cannot be used for preparing a coffee drink.

To sum up, it can be noted that all coffee machines of this kind and known in the art, i.e., which make use of coffee powder portions located on a transporting tape for brewing a coffee drink, have the disadvantage that always a plurality of coffee powder portions must be moved simultaneously with the result that always a number of coffee powder portions are outside the storage container. These coffee powder portions are subjected to the atmospheric humidity, oxidize and loose their flavor. The insertion of the initial portion of the transporting tape must be accomplished manually whereby at least the first coffee powder portion provided on the tape is lost and cannot be used for preparing a coffee drink. With these coffee machines, all coffee powder portions contained on a tape must be brewed before another tape can be used. Thus, it is not possible to prepare a decaffeinated drink just in between.

OBJECTS OF THE INVENTION

It is an object of the present invention to provide a method for preparing a coffee beverage by brewing a portion of coffee powder in a brewing chamber as well as a coffee machine adapted to perform this method which avoid the disadvantages of the prior art.

Particularly, it is an object of the present invention to provide a method for preparing a coffee beverage by brewing a portion of coffee powder in a brewing chamber as well as a coffee machine adapted to perform this method in which the coffee powder portions not actually used for preparing a coffee beverage are kept in an essentially closed container such that the not yet used portions remain fresh and keep their full flavor.

It is a still further object of the invention to provide a method for preparing a coffee beverage by brewing a portion of coffee powder in a brewing chamber as well as a coffee machine adapted to perform this method which enable a fully automated preparation of a coffee beverage without the need to manually insert a transporting tape into a transporting tape feeding mechanism.

Finally, it is a still further object of the invention to provide a method for preparing a coffee beverage by brewing a portion of coffee powder in a brewing chamber as well as a coffee machine adapted to perform this method in which really every coffee powder portion contained on the tape can be used for preparing a coffee beverage.

SUMMARY OF THE INVENTION

The meet these and other objects, the invention provides, according to a first aspect, a method for preparing a coffee beverage by brewing a portion of coffee powder in a brewing chamber. A plurality of portions of coffee powder are arranged along a transporting tape in a mutual distance. The coffee powder portions arranged along the transporting tape are received in a container having an outlet opening. In a first step, that particular initial portion of the transporting tape lying in the region of the outlet opening of the container is grasped. Then, the transporting tape is pulled out of the container through the outlet opening to such an extent that only that transporting tape portion is outside the container which contains the frontmost coffee powder portion on the transporting tape. Thereafter, the transporting tape is broken up behind the frontmost coffee powder portion taken out of the container while the coffee powder portion following next on the transporting tape is still completely in the interior of the container.

The broken up transporting tape portion together with the coffee powder portion contained thereon is then transported into the brewing chamber and a coffee beverage is brewed with the help of the coffee powder portion just transported into the brewing chamber.

The above summarized method renders possible, for the first time, that a coffee powder portion located on a transporting tape is grasped in the storage container and individually removed therefrom, whereby the remaining coffee powder portions remain in the storage container and keep their full flavor.

Preferably, the initial portion of the transporting tape following the broken up and removed transporting tape portion and still being located in the interior of the container is fixed in the region of the outlet opening of the container. Thus, the initial portion of the remaining tape is fixed again in a well defined position such that the subsequent grasping thereof, upon preparing the next coffee drink, is greatly simplified.

According to a second aspect, the invention also provides a coffee machine adapted to perform the above mentioned method. The coffee machine comprises a frame, a brewing chamber arranged in the frame and having a first brewing chamber portion and a second brewing chamber portion, and means for supplying hot water to the brewing chamber.

Moreover, means are provided for opening the brewing chamber by separating the first and second portions thereof from each other to enable a portion of coffee powder to be loaded into the brewing chamber and to be removed from the brewing chamber, respectively, and for closing the brewing chamber by joining together the first and second portions thereof to enable a coffee beverage to be brewed by feeding hot water into the brewing chamber containing the portion of coffee powder.

The first brewing chamber portion is stationary with respect to the frame means and the second brewing chamber portion is longitudinally movable and rotatable with respect to the first brewing chamber portion. A catch member is provided which is operatively coupled to the second brewing chamber portion and adapted to positively engage an initial portion of a transporting tape containing a plurality of coffee powder portions arranged therealong in mutual distance.

According to a preferred embodiment, the coffee machine comprises a constructive unit, consisting of a stationary outer portion, a rotatable brewing chamber portion received and guided therein, a catch member for grasping the initial portion of the transporting tape, and a driving means. Such a constructive unit renders possible a compact shape of the coffee machine and can be easily replaced.

In a further embodiment, mounting means are provided for the coupling of a transporting tape container with fresh coffee powder portions to the coffee machine in a positionally well defined manner. By the positionally well defined coupling of the container with the fresh coffee powder portions to the coffee machine, the position of the initial portion of the transporting tape is well known so that upon coupling the container to the coffee machine also the initial portion of the transporting tape is placed in a predetermined position where it can be easily grasped by the aforementioned catch member.

BRIEF DESCRIPTION OF THE DRAWINGS

In the following, the method according to the invention will be further described, with reference to the accompanying drawings, in which an embodiment of the coffee machine according to the invention is shown. Particularly, in the drawings:

FIGS. 9 to 16 show the details of the coffee machine which are essential in connection with the present invention.

DETAILED DESCRIPTION OF A PREFERRED EMBODIMENT

Figure 1:
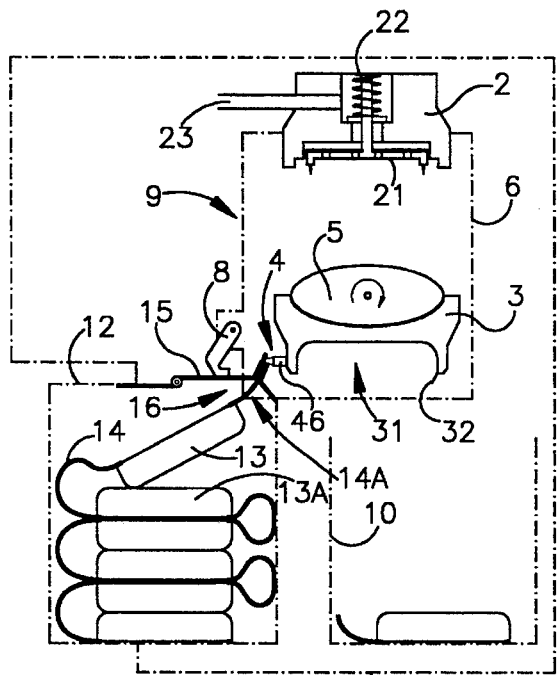
FIGS. 1 to 8 show a strictly schematic view of the relevant parts and elements of a coffee machine during the individual phases of a coffee preparation cycle.
Figure 2:
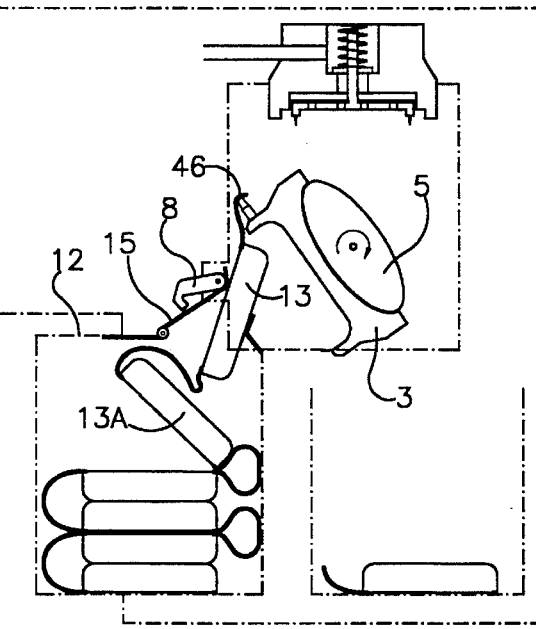

In FIGS. 1 to 8, there is schematically shown a coffee machine 1 in different phases of a beverage preparation cycle. With the help of these drawing figures, in the following, the most important parts and elements of the coffee machine 1 and some method steps for the preparation of a coffee beverage will be further described. For clarity's sake, well known parts and elements of the coffee machine 1 which do not have an immediate relation to the invention are omitted. The parts and elements of the coffee machine 1 shown in the drawings are an upper portion 2 of the brewing chamber, a lower portion 3 of the brewing chamber, a catch member 4, a driving shaft 5, an outer portion 6, a closure shackle 8, a container 12 for receiving fresh portions 13, 13A of coffee powder which are connected to each other by means of a transporting tape 14, as well as a waste container 10 for receiving used portions 13B of coffee powder.

The lower portion 3 of the brewing chamber, the catch member 4 and the driving shaft 5 are movably received in the outer portion 6 and combined to a constructive unit 9. The upper portion 2 of the brewing chamber is fixedly connected to the outer portion 6 and comprises a valve member 21 biased by means of a spring member 22 and provided with passages. The top side of the lower portion 3 of the brewing chamber, as seen in its brewing position, is provided with a recess 31 in the form of a brewing trough and with an integrally formed separating member 32. The catch member 4 is coupled to the lower portion 3 of the brewing chamber, whereby the lower portion 3 of the brewing chamber is coupled to the driving shaft 5 and driven thereby with the help of a positive connection. The driving shaft 5 has oval cross sectional shape and is coupled to a driving motor, not shown in the drawings. In order to detect the position of the lower portion 3 of the brewing chamber, two differently polarized magnets are provided on the lower portion 3 of the brewing chamber, and a Hall probe is mounted on the outer portion 6 in a corresponding position.

The transporting tape 14 comprises an initial portion 14A, 14B; in this initial portion 14A, 14B as well as in each case between two adjacent coffee portions 13, 13B, there are provided breakouts, not visible in these views, for fixing, grasping and moving the transporting tape 14. Moreover, in each case between two adjacent coffee portions 13, 13A, the transporting tape 14 is provided with a transversely running perforation. The container 12 containing the fresh coffee portions 13, 13A comprises a closure lid 15 biased by a spring member. In order to keep the transporting tape 14 in its initial portion 14A, 14B in a well defined position, the tape 14 is fixed at its breakouts by means of cam members provided on said closure lid 15.

The outer portion 6 is provided with guiding grooves not visible in FIGS. 1 to 8 which serve for guiding the lower portion 3 of the brewing chamber and the catch member 4. For this purpose, the lower portion 3 of the brewing chamber as well as the catch member 4 comprise cam members and pin members, respectively, guided in said grooves.

In FIG. 1, the initial state of the coffee machine 1 is shown. Thereby, the container 12 with the fresh portions 13, 13A of ground coffee is fixed to the coffee machine 1 in a predetermined position. The lower portion 3 of the brewing chamber is rotated by the driving shaft in such a position in which its recess 31 is directed downwards. In this position, pin members 46 provided on the catch member 4 engage the breakouts of the transporting tape 14, 14A through slots provided in the closure lid 15. The closure shackle 8 actuated by the lower portion 3 of the brewing chamber is swiveled somewhat to the left such that the closure lid 15 can be opened. If the lower portion 3 of the brewing chamber, together with the catch member 4, is rotated under the influence of the driving shaft 5 in clockwise direction, the topmost and grasped coffee portion 13 is pulled upwards and, thereby, the closure lid 15 opened. This phase is shown, in a snapshot, in FIG. 2.

Figure 3:
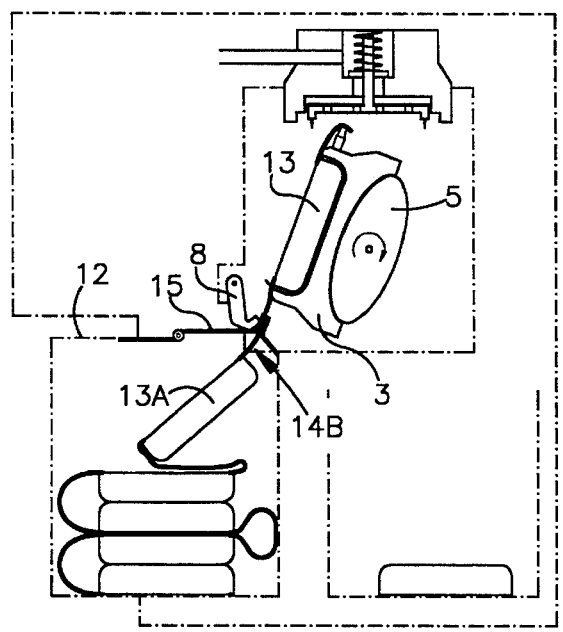
Figure 4:
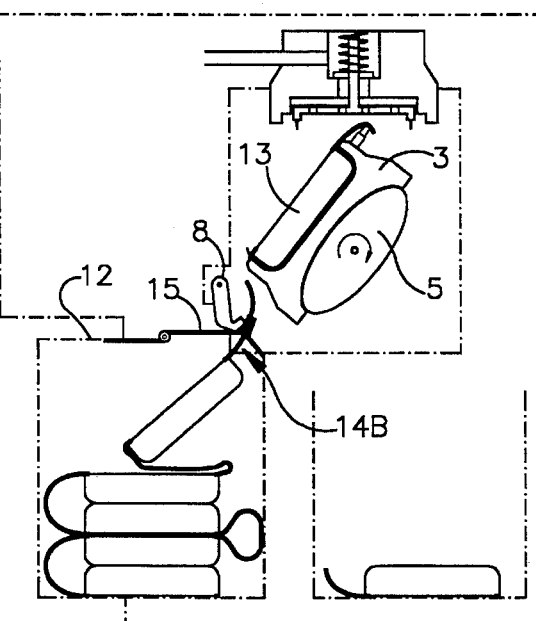

If the lower portion 3 of the brewing chamber and the catch member 4 are further rotated, first the uppermost portion 13 of coffee is fully pulled out of the container 12 and thereafter, under the influence of gravity, laid into the recess 31. Thereby, the closure shackle is inevitably swiveled to the right whereby the closure lid 15 is closed, additionally to the influence of the spring force. This situation is shown in FIG. 3. The timing of the closing of the closure lid 15 is such that the transporting tape 14, 14B is fixed at the provided breakouts by the closure lid 15. For this purpose, the closure lid 15 is provided with cam members integrally formed therewith which engage the breakouts in the transporting tape 14, 14B. If the brewing chamber portion 3 and, therewith, the catch member 4 is further rotated, as can be seen in a snapshot in FIG. 4, the transporting tape 14 is torn off at the perforation provided thereon. In order to support this tearing-off operation, the brewing chamber portion 3 is provided with a separating member 32, located at the side thereof which is opposite to the catch member 4.

Figure 5:
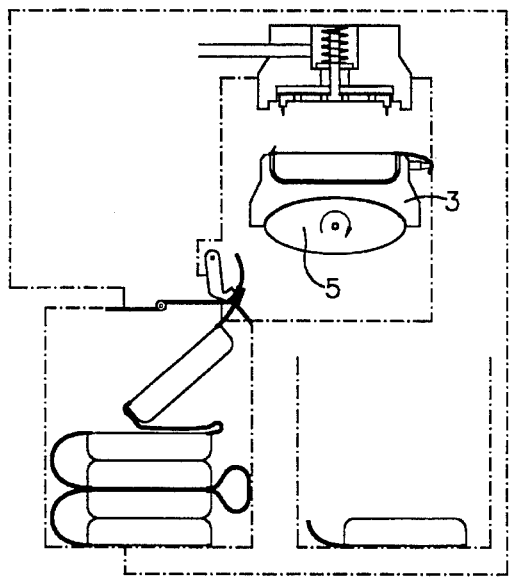

In FIG. 5, the lower portion 3 of the brewing chamber is shown in a position where it is rotated upwards with the recess 31 being horizontally aligned. From this position, the guiding pins of the lower portion 3 of the brewing chamber are guided into vertically running grooves provided in the outer portion 6 by means of two swivelable lever members provided on the outer portion 6. Thus, if the driving shaft 5 is further rotated, the positive connection between the lower portion 3 of the brewing chamber and the driving shaft 5 is released such that the lower portion 3 of the brewing chamber performs an upwardly directed vertical movement under the influence of the oval shaped portion of the driving shaft 5.

Figure 6:
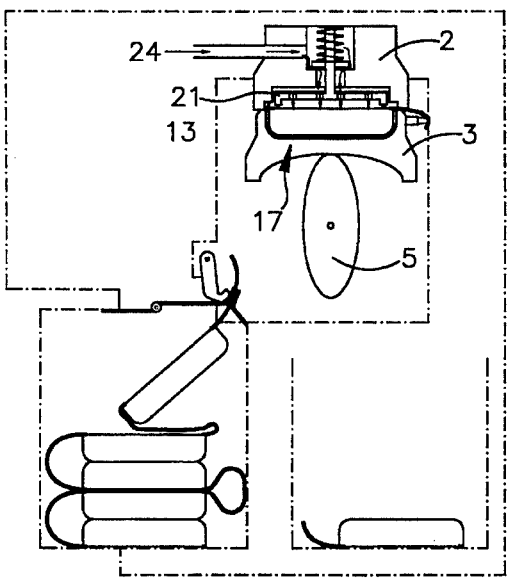

In FIG. 6, the driving shaft 5 is shown in a position in which it is further rotated by another 90° as compared to the position shown in FIG. 5. In this situation, the lower portion 3 of the brewing chamber takes its uppermost position in which it sealingly engages the upper portion 2 of the brewing chamber. Shortly before the lower portion 3 of the brewing chamber has reached its uppermost position, the lever member which guides the lower portion 3 of the brewing chamber into the aforementioned vertically grooves returns to its initial position; thereby, the lower portion 3 of the brewing chamber, after having been moved downwards, can be further rotated in its guides. Consequently, the real brewing chamber 17 is formed and closed, respectively, by the two brewing chamber portions 2, 3. In this brewing position, the one of the magnets provided on the lower portion 3 of the brewing chamber is in a position immediately in front of the Hall probe; thus, the latter one creates a signal. With the help of the polarity of the magnet, the electronic control means to which the Hall probe is connected can monitor the position of the lower portion 3 of the brewing chamber and determine that the lower portion 3 of the brewing chamber is in its brewing position. Consequently, the rotation of the driving motor for the driving shaft 5 is stopped and the brewing cycle is started.

In the last phase of the upwardly directed movement of the lower portion 3 of the brewing chamber, the brewing water valve member 21 is pushed upwardly by means of the coffee portion 13 received in the recess 31 of the lower portion 3 of the brewing chamber, contrary to the force exerted by the spring member 22, such that the supply of brewing water is released. The brewing operation itself is symbolized by means of an arrow 24 in FIG. 6. The brewing water can proceed into the brewing chamber 17 through passages provided in the brewing water supply valve member 21 and brew up the coffee powder portion 13 received therein. The freshly brewed coffee beverage flows to a beverage outlet through not shown outlet channels coupled to the lower portion 3 of the brewing chamber if it is in its brewing position.

Figure 7:
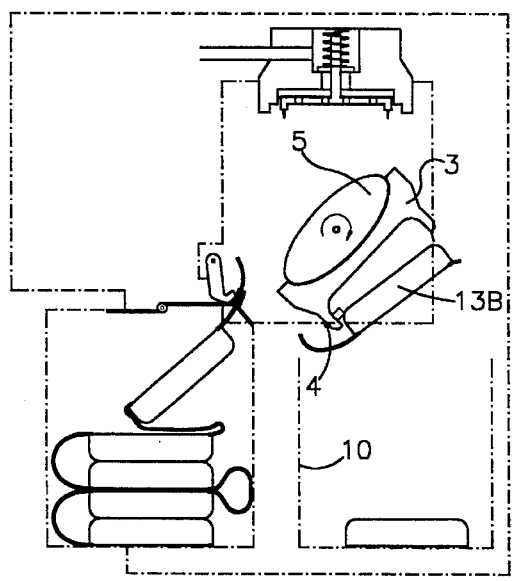

In order to reach the position shown in FIG. 7, the driving shaft 5 is rotated further in clockwise direction after the brewing operation has been finished. Thereby, the lower portion 3 of the brewing chamber is moved downwards under the influence of gravity and Supported by the force of a spring. As soon as the driving shaft 5 has reached a position in which it is rotated by 90° as compared to the position shown in FIG. 6, the lower portion 3 of the brewing chamber positively engages the driving shaft 5 again. Upon further rotating the driving shaft 5, the lower portion 3 of the brewing chamber and, therewith, the recess 31 is swiveled downwards whereby the used coffee powder portion releases from the lower portion 3 of the brewing chamber and falls, under the influence of gravity, into the waste container 10. In order to avoid that the used coffee powder portion 13B and the corresponding transporting tape section, respectively, are no longer fixed to the catch member 4 during this phase, the catch member 4 is somewhat pulled back; this is accomplished preferably by a corresponding design of the guiding grooves in this region.

Figure 8:
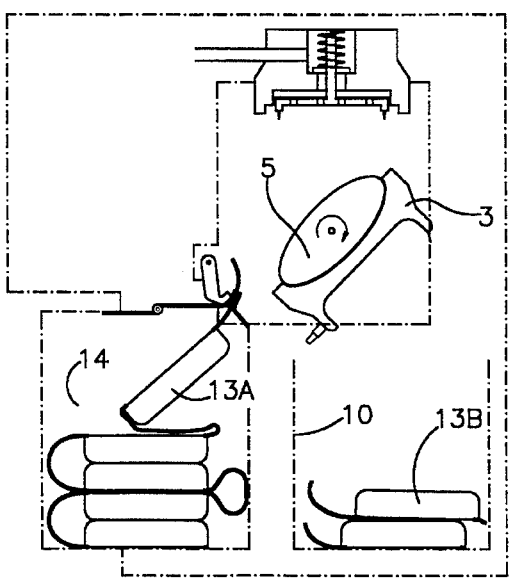

In FIG. 8, finally, the rest position is shown which is taken by the lower portion 3 of the brewing chamber and by the catch member 4 before a new transporting tape portion with the coffee powder portion 13B located thereon is grasped. This position of the lower portion 3 of the brewing chamber is monitored by the Hall probe again and the rotational movement of the driving shaft 5 is stopped by halting the driving motor. This position is maintained until the order to prepare a new coffee beverage is received. In this rest position, the container 12 can be removed or re-inserted because the catch member 4 does not project into its fixing portion.

In FIGS. 9 to 12, there are shown the outer portion 6, the rotatable lower portion 3 of the brewing chamber, the catch member 4 as well as the driving shaft 5 in more detailed views. With the help of these figures, the characteristics which are essential to the present invention will be explained in more detail. Consequently, further characteristics which are not essential in connection with the present invention are either not shown or are not further explained.

FIG. 9 shows the outer portion 6 and a side wall thereof, respectively, in a lateral view, while FIG. 10 shows the outer portion 6 in a front view. The lateral parts 61 each are provided with two guiding tracks 62, 63. The one of the guiding tracks, i.e. the inner guiding track 62 has at least approximately circular shape. The other one, i.e. the outer guiding track 63, has an irregular shape. The inner guiding track 62 is further provided with a vertically upwardly running guiding groove 64 located at the upper dead center. The outer guiding track 63 is provided with an upwardly running groove 72 as well which is, however, laterally offset with regard to the guiding groove 64. Both inner sides of the lateral parts 61 each are provided with a projecting guiding pin 69 integrally formed therewith, while on each outside of the lateral parts 61 a movable lever member 65 is connected. The two lateral parts 61 comprise at their front faces in each case two mounting members 70, 71 which are designed for fixing a container with fresh coffee powder portions to the two lateral parts 61. Moreover, both lateral parts 61 are provided with a central bore 68 for rotatably receiving the driving shaft 5.

FIGS. 11 and 12 show the rotatable lower portion 3 of the brewing chamber in a lateral view and in a top view. The top of the lower portion 3 of the brewing chamber is provided with a recess 31, while the lower side thereof is provided with a sinking 33 as well as with two vertically projecting guiding ribs 34. In the region of one side of the recess 31, which serves as a brewing trough, the separating member 32 in the form of a knife strip is outlined. In order to ensure a reliable separating of the transporting tape, the knife rib 32 is designed oblique or roof-shaped along its cutting edge. A channel 37 runs from the deepest point of the brewing trough to an outlet which is designed as outlet socket 38. At the front face opposite to the outlet, there is provided a gap 39 adapted to receive the catch member 4. Moreover, the lower portion 3 of the brewing chamber comprises at both sides in each case a guiding plate member 35 provided with longitudinal slots 36 as well as two guiding pins 30 projecting therefrom.

In FIGS. 13 and 14, the catch member 4 is shown in a side view and in a top view, respectively. As can be seen, it is generally designed in the shape of a slide or pusher. At the one front face, pins 46 are integrally formed, while the two lateral sides are provided in each case with a guiding cam member 45.

Finally, in FIGS. 15 and 16, the driving shaft 5 is shown in a side view and in a top view, respectively. As can be clearly seen, the driving shaft is composed of a plurality of individual segments 51 having essentially oval shape. The shape of these segments 51, thereby, corresponds to the shape of the sinking 33 provided on the lower side of the lower portion 3 of the brewing chamber. Moreover, in the center of the driving shaft 5, a gap 52 is provided adapted to receive the vertical guiding ribs 34 of the lower portion 3 of the brewing chamber. At one end, the driving shaft 5 comprises a coupling member 53 with a square cross sectioned recess by means of which the driving shaft 5 can be coupled to a not shown driving motor.

In order to assemble the elements and components described above to a constructive unit, the catch member 4 is inserted into the gap 39 of the rotatable lower portion 3 of the brewing chamber, and the latter one is inserted, together with the driving shaft 5, into the outer portion 6. Thereby, the guiding pins 30 of the rotatable lower portion 3 of the brewing chamber are received in the inner guiding track 62 which has essentially circular shape, while the guiding cam members 45 of the catch member 4 are received in the outer guiding track 63 which has irregular shape. The driving shaft 5 is received in the central bores 68 of the outer portion 6 and positively engages with its oval segments 51 the sinking 33 provided in the lower portion 3 of the brewing chamber. The two vertically extending guiding ribs 34 of the lower portion 3 of the brewing chamber surround the driving shaft 5 in the region of its gap 52 in the center of the shaft. Due to this assembly, there is a positive connection between the lower portion 3 of the brewing chamber and the catch member 4 as well as between the lower portion 3 of the brewing chamber and the driving shaft 5.

In order to explain the mode of operation, it is assumed that the elements take an initial position as shown in FIG. 1. The brewing chamber portion 3 is, for this purpose, brought into its initial position, i.e. rotated by 180° with regard to the position shown in FIG. 11. In this position, the catch member 4 projects to a relatively great extent with respect to the rotatable lower portion 3 of the brewing chamber. This is caused by the radial distance between the inner essentially circular guiding track 62 and the outer irregularly shaped guiding track 63, as the guiding cam members 45 and the guiding pin members 30 of the catch member 4 and the lower portion 3 of the brewing chamber, respectively, are guided in these guiding tracks 62, 63. Moreover, connected to the mounting members 70, 71 of the outer portion 6 is the container 12 with the fresh coffee powder portions 13 received therein, whereby the beginning portion 14A of the transporting tape 14 is fixed in a well defined position by means of the closure lid 15. For this purpose, the transporting tape 14 is provided, in front of a coffee portion 13, with breakouts by means of which the transporting tape 14 can be fixed and, moreover, by means of which it can also be grasped and displaced. This is accomplished by the pins 46 of the catch member 4 engaging the free breakouts through slots in the closure lid 15 and thereby positively catch the transporting tape 14. It must be noted that neither the container 12 nor the transporting tape 14 nor the coffee powder portions 13 are shown in these figures in favor of an increased clarity of the drawings. During the upwardly directed rotational movement of the lower portion 3 of the brewing chamber, the coffee powder portion is pulled into the recess 31 of the lower portion 3 of the brewing chamber under the influence of gravity and thereby takes already a well defined position.

If the lower portion 3 of the brewing chamber and the catch member 4 are further rotated in clockwise direction by means of the driving shaft 5, then the guiding pin members 30 of the lower portion 3 of the brewing chamber engage the rotatable lever member 65 and rotate the latter one up to a stop member 67, all this before the upper dead center of the inner guiding track 62 is reached. The consequence is that the lower portion 3 of the brewing chamber no longer can be further rotated along the inner guiding track 62. The position of the lever member 65 mentioned above, in which it abuts against the stop member 67, is shown in FIG. 9. If the driving shaft 5 is further rotated from this position, then the guiding pin members 30 abutting against the lever member 65 cannot further follow the inner guiding track 62 but are forced into the vertically running grooves 64 under the influence of the oval shaped segments 51 of the driving shaft because, upon further rotation of the driving shaft 5, the positive connection between the driving shaft 5 and its oval shaped segments 51, respectively, and the lower portion 3 of the brewing chamber is released; thus, the lower portion 3 of the brewing chamber is forced to perform a vertical motion in the sense of an actuation of a cam shaft.

As soon as the guiding pin members 30 of the lower portion 3 of the brewing chamber have reached a position vertically above the lever member 65, the latter one rotates, under the influence of gravity, towards the left and abuts against a second stop member 66 in its rest position.

In order to ensure that the catch member 4 is also moved vertically together with the lower portion 3 of the brewing chamber to which it is fixed, the afore mentioned vertically upwardly running grooves 72 of the outer guiding track 63 are provided along which the guiding cam members 45 of the catch member 4 can travel. During the upward movement, the lower portion 3 of the brewing chamber is guided, on the one hand, roughly by the pin members 30 traveling along the vertically running grooves 64; on the other hand, the guiding pin members 69 integrally formed on the inner faces of the outer portion 6 engage the longitudinal slots 36 of the guiding plate members 35 of the lower portion 3 of the brewing chamber whereby an exact centering of the lower portion 3 of the brewing chamber is reached. For this purpose, the longitudinal slots 36 are designed to be slightly conical in upward direction.

The two vertically projecting guiding ribs 34 of the lower portion 3 of the brewing chamber which surround the driving shaft 5 prevent the lower portion 3 of the brewing chamber from performing a swiveling motion during its upward displacement. The length of the vertical stroke of the lower portion 3 of the brewing chamber is fixed such that the lower portion 3 of the brewing chamber sealingly engages the upper portion 2 of the brewing chamber once the lower portion 3 has reached the end of its vertical stroke. Thus, the real brewing chamber 17 is formed and closed; a coffee beverage can be brewed. The coupling means for connecting the outlet socket means 38 formed on the lower portion 3 of the brewing chamber to the real beverage outlet are not shown in the drawings as well. A further not shown element is a brewing chamber insert which is put into the recess 31 provided in the lower portion 3 of the brewing chamber and forming the brewing trough. Such an insert preferably is provided with radially running slots which centrally merge and which are connected to the outlet socket 38 by means of the channel 37. This measure supports the penetration of the coffee powder portion by the brewing water. These parts and elements being well known to any person skilled in the art removes the need to further explain the design and functioning thereof.

A further rotation of the driving shaft 5 has the effect that the lower portion 3 of the brewing chamber moves downwards again. In order to support this downward movement, two (not shown) spring members can be provided which are connected to the outer portion 6 and engage the pin members 30 of the lower portion 3 of the brewing chamber; thereby, the latter one is forced downwards, additionally to the influence of gravity.

Finally, in order to eject the used coffee powder portion, the driving shaft 5 is further rotated. Thereby, the brewing trough 31 of the lower portion 3 of the brewing chamber, together with the catch member 4, is swiveled in downward direction. The two guiding tracks 62, 63 are designed such that their mutual distance is minimal in the region of their lower dead centers. Thus, it is ensured that the catch member 4 gradually retires into the gap 39 of the lower portion 3 of the brewing chamber during the downwardly directed rotational movement. The result is that the coffee powder portion received in the recess 31 of the lower portion 3 of the brewing chamber no longer is kept by the pin members 46 of the catch member 4 such that the used coffee powder portion is safely released from the recess 31 and falls, under the influence of gravity, into the waste container 10.

A constructive unit designed in accordance with the present invention and as herein before described presents the advantage that it is very small; thus it is possible to design the entire coffee machine with small dimensions as well.

To sum up, it can be stated that the invention renders possible to prepare, by means of such a coffee machine and such a constructive unit, respectively, a coffee beverage fully automatically with the help of a coffee powder portion contained on a transporting tape. One difference between the coffee machine according to the invention and coffee machines of similar kind known in the art is that only the coffee power portion effectively needed for the preparation of a coffee beverage is taken out of the container. Thus, the other coffee powder portions not needed for the actual preparation cycle remain safely packed in the container 12 and keep their full flavor. In order to impede an oxidation of the coffee powder portions remaining in the container 12, the container 12 can be filled with a preferably inert gas which is heavier than air.

A further advantage is that the container 12 containing the fresh coffee powder portions and being fixed to the coffee machine can be replaced anytime by another container which is equipped with another kind of coffee, for example decaffeinated coffee. With this aim, it would be conceivable to provide a mechanism by means of which different containers with, if appropriate, coffee powder portions of a different taste are assigned to the coffee machine and by means of which a desired container can be displaced to be located in the operating range of the catch member 4. Such a mechanism could comprise, for example, a rail means provided with some sort of fixing elements to displaceably receive a plurality of coffee powder portion containers.

What is claimed is:

1. A coffee machine comprising:
   a frame means;
   a brewing chamber arranged in said frame means and having a first brewing chamber portion and a second brewing chamber portion, said first and second brewing chamber portions being sealingly joined together to form said brewing chamber;
   means for supplying hot water to said brewing chamber;
   means for opening said brewing chamber by separating said first and second portions thereof from each other to enable a portion of coffee powder to be loaded into said brewing chamber and to be removed from said brewing chamber, respectively, and for closing said brewing chamber by joining together said first and second portions thereof to enable a coffee beverage to be brewed by feeding hot water into said brewing chamber containing said portion of coffee powder;
   said first brewing chamber portion being fixedly connected to said frame means and said second brewing chamber portion being movable relative to said frame means toward and away from said first brewing chamber portion and being rotatable with respect to said first brewing chamber portion and said frame means; and
   a catch member operatively coupled to said second brewing chamber portion and adapted to positively engage an initial portion of a transporting tape containing a plurality of coffee powder portions arranged thereAlong.

2. A coffee machine according to claim 1, further comprising a driving shaft means for driving said second brewing chamber portion and/or said catch member relative to said frame, said frame means comprising a stationary outer portion adapted to receive and guide movement of said catch member.

3. A coffee machine according to claim 2 in which said second brewing chamber portion is provided with guiding pin members and in which said catch member is provided with guiding cam members.

4. A coffee machine according to claim 2 in which said outer portion comprises two lateral parts provided with two pairs of guiding tracks, a first track pair of said two pairs of guiding tracks being adapted to receive and guide said guiding pin members provided on said second brewing chamber portion and a second track pair of said two pairs of guiding tracks being adapted to receive and guide said guiding cam members provided on said catch member.

5. A coffee machine according to claim 4 in which said first track pair adapted to guide said second brewing chamber portion has essentially circular shape.

6. A coffee machine according to claim 5 in which said second track pair adapted to guide said catch member has an irregular shape differing from the essentially circular shape of said first track pair.

7. A coffee machine according to claim 5 in which said second brewing chamber portion and said catch member are forced to a mutual relative motion due to the different shape of said first and second track pairs.

8. A coffee machine according to claim 5 in which each track of said essentially circular shaped first track pair additionally has a guiding groove running vertically upwards and being located in the region of the upper dead center.

9. A coffee machine according to claim 1 in which said outer portion is provided with two movably mounted lever members which are operatively coupled to said second brewing chamber portion and its guiding pin members, respectively, such that said guiding pin members of said second brewing chamber portion are forced to slide into said vertically running grooves provided in said upper dead center.

10. A coffee machine according to claim 4 in which said two lateral parts of said outer portion are provided each with a spring means located in the region of said guiding tracks which bias said second brewing chamber portion in the direction of gravity, such that said second brewing chamber portion is forced downwards in its stroke after having passed the upper dead center.

11. A coffee machine according to claim 2 in which said driving shaft means is coupled to said second brewing chamber portion by means of a positive coupling connection.

12. A coffee machine according to claim 1, further comprising mounting means for the coupling of a transporting tape container with fresh coffee powder portions to the coffee machine in a positionally well defined manner.

13. A coffee machine according to claim 12 in which said mounting means are integrally formed on said outer portion.

14. A coffee machine according to claim 1 in which said catch member operatively coupled to said second brewing chamber portion rotates relative to said frame means.

15. A coffee machine according to claim 1 in which said catch member is provided with a plurality of pin members adapted to engage breakouts provided in said transporting tape.

16. A coffee machine according to claim 1 in which said first stationary brewing chamber portion is the upper brewing chamber portion and said second movable brewing chamber portion is the lower brewing chamber portion.

17. A coffee machine according to claim 1 in which said first brewing chamber portion is provided with a recess for receiving a portion of coffee powder.

18. A coffee machine according to claim 11, further comprising a cutting means for breaking up said transporting tape.

19. A coffee machine according to claim 18 in which said cutting means is designed as a knife-shaped cutting edge which advantageously has an oblique or roof-like shape.

20. A coffee machine according to claim 18 in which said cutting means is integrally formed on said second brewing chamber portion.

21. A coffee machine according to claim 1 in which said first brewing chamber portion is provided with a brewing water supply valve means biased by a spring means, said brewing water supply valve means being adapted to be opened by a coffee powder portion received in said second brewing chamber portion, contrary to the force exerted by said spring means.

22. A coffee machine according to claim 1, further comprising an actuating means for compulsory closing a lid member movably connected to the outlet opening of a container receiving a transporting tape with fresh coffee powder portions.

23. A coffee machine according to claim 22 in which said actuating means includes a self-locking closure shackle member whereby said closure shackle member is adapted to be actuated and swiveled by said second brewing chamber portion during the grasping and moving of the transporting tape, said closure shackle member being further adapted to restrain the movement of said lid member during actuation and to close said lid member after actuation.

24. A coffee machine according to claim 1 in which said second brewing chamber portion is provided with at least one pulse generator means by means of which the position of said second brewing chamber portion is detected in order to control a driving motor adapted to drive said driving shaft means.

25. A coffee machine according to claim 24 in which said impulse generator means comprise two differently polarized magnet members located on said second brewing chamber portion as wall as Hall probe means located on said outer portion, such that two positions of said second brewing chamber portion can be recognized, namely a brewing position and a rest position, and that said driving motor can be stopped if said second brewing chamber portion takes its brewing and rest positions, respectively.

* * * * *

UNITED STATES PATENT AND TRADEMARK OFFICE
CERTIFICATE OF CORRECTION

PATENT NO. : 5,520,093
DATED : May 28, 1996
INVENTOR(S) : Anton Ackermann

It is certified that error appears in the above-indentified patent and that said Letters Patent is hereby corrected as shown below:

Column 12, line 25, change "2" to —3—.

Column 12, line 40, change "5" to —6—.

Column 12, line 49, change "1" to —8—.

Column 13, line 1, change "1" to —2—.

Column 13, line 21, change "11" to —1—.

Signed and Sealed this

Twenty-sixth Day of November 1996

Attest:

BRUCE LEHMAN

*Attesting Officer*  *Commissioner of Patents and Trademarks*